(12) United States Patent
Lawson et al.

(10) Patent No.: US 10,270,734 B2
(45) Date of Patent: *Apr. 23, 2019

(54) SYSTEM AND METHOD FOR ENABLING REAL-TIME EVENTING

(71) Applicant: Twilio, Inc., San Francisco, CA (US)

(72) Inventors: Jeffrey Lawson, San Francisco, CA (US); John Wolthuis, San Francisco, CA (US); Evan Cooke, San Francisco, CA (US); Jeffrey Comer, San Francisco, CA (US)

(73) Assignee: Twilio, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/936,670

(22) Filed: Mar. 27, 2018

(65) Prior Publication Data

US 2018/0212919 A1 Jul. 26, 2018

Related U.S. Application Data

(63) Continuation of application No. 14/452,277, filed on Aug. 15, 2014, now Pat. No. 9,967,224, which is a continuation of application No. 13/170,056, filed on Jun. 27, 2011, now Pat. No. 8,838,707.

(60) Provisional application No. 61/358,732, filed on Jun. 25, 2010.

(51) Int. Cl.
*H04L 12/58* (2006.01)
*G06F 9/54* (2006.01)

(52) U.S. Cl.
CPC .............. *H04L 51/32* (2013.01); *G06F 9/542* (2013.01); *H04L 51/04* (2013.01); *G06F 2209/544* (2013.01)

(58) Field of Classification Search
CPC ................................. H04L 51/04; H04L 51/38
See application file for complete search history.

(56) References Cited

U.S. PATENT DOCUMENTS

| 7,882,253 B2* | 2/2011 | Pardo-Castellote | .... H04L 67/12 709/224 |
| 2002/0016867 A1* | 2/2002 | Kampe | ................... G06F 9/542 719/318 |
| 2005/0152286 A1* | 7/2005 | Betts | ...................... H04L 45/02 370/255 |
| 2006/0287593 A1* | 12/2006 | Jaggu | ..................... A61B 6/566 600/407 |
| 2008/0307436 A1* | 12/2008 | Hamilton | ................ G06F 9/542 719/318 |

* cited by examiner

*Primary Examiner* — Jason D Recek
(74) *Attorney, Agent, or Firm* — Schwegman Lundberg & Woessner, P.A.

(57) ABSTRACT

A method and system for real-time eventing including interacting with at least one configuration attribute according to instructions specified through an application programming interface (API); adding subscribers for an event channel; generating an event from operation of an application; publishing the event message to the event channel on an event router; processing the event message according to the at least one configuration attribute; identifying a subscriber to the event channel; and sending the event from the event router to the subscriber.

20 Claims, 10 Drawing Sheets

US 10,270,734 B2

SYSTEM AND METHOD FOR ENABLING REAL-TIME EVENTING

CROSS-REFERENCE TO RELATED APPLICATIONS

This application is a continuation of U.S. patent application Ser. No. 14/452,277, filed 5 Aug. 2014, which is a continuation of co-pending U.S. patent application Ser. No. 13/170,056, filed 27 Jun. 2011, which claims the benefit of U.S. Provisional Application Ser. No. 61/358,732, filed 25 Jun. 2010, the entirety of both of which are incorporated by reference herein.

TECHNICAL FIELD

This invention relates generally to the internet communication field, and more specifically to a new and useful system and method for enabling real-time eventing in the internet communication field.

BACKGROUND

For many years, web developers and networked applications were limited to a client repeatedly polling a server with a request to receive updated information. In recent years, new mechanisms have been developed to allow a server to notify a client when new events occur. Pubsubhubbub, push notifications, and Comet are a few technologies that have enabled more of a publisher and subscriber relationship between networked clients. However, many publications require multiple publications that may depend on dynamic properties, and subscribers may have additional requirements such that simply receiving event messages from a publisher is unsatisfactory. Thus, there is a need in the internet communication field to create a new and useful system and method for enabling real-time eventing. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Method for Enabling Real-Time Eventing

Figure 1:
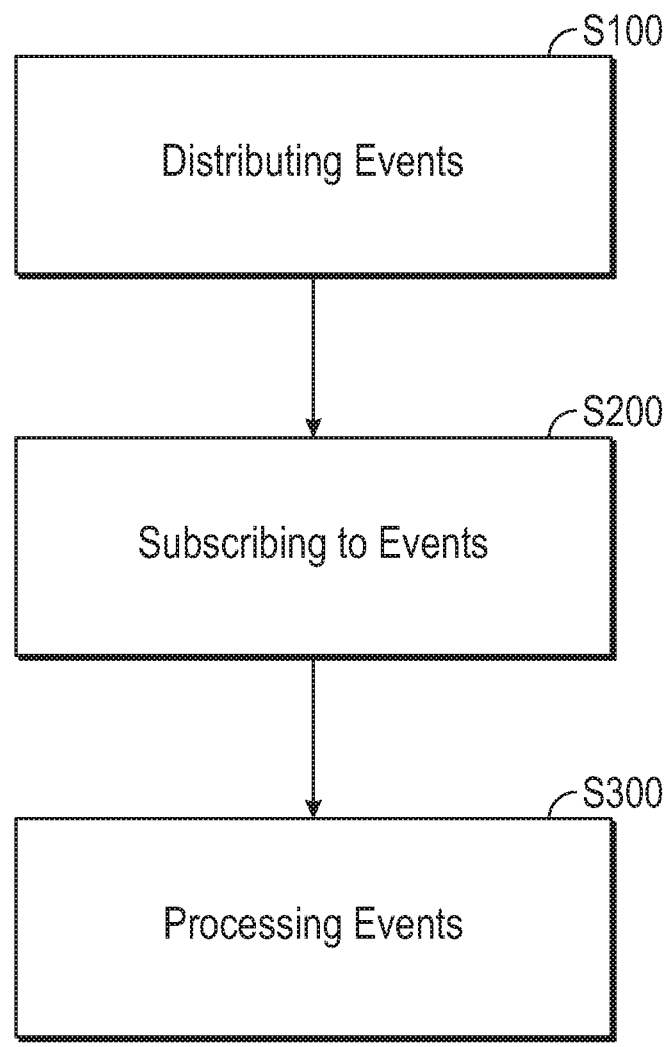
FIG. 1 is a flowchart representation of a method of a preferred embodiment of the invention.

As shown in FIG. 1, a method 100 of a preferred embodiment for enabling real-time eventing preferably includes distributing events S100, subscribing to events S200, and processing events S300. The method 100 functions to provide configurable processing and handling of real-time events. Event channels of an event router preferably have configuration attributes that are preferably accessible through an application programming interface (API), a web interface, or through any suitable interface. Event channels are preferably the event name to which a publisher will publish and a subscriber subscribe. The subscriber may alternatively or additionally specify event attributes or metadata to specify a subscription. This preferably enables events to be configured. At least one of these attributes is preferably a configuration attribute relating to the processing of an event message while passing through the event router. The method is preferably used to enable configurable routing, event delegation, implementation of a webhook, event persistence, alternate or additional routing of events, and/or any suitable event processing step. The event processing is preferably built on top of an event publication and subscription infrastructure. In one preferred application, the publication and subscription infrastructure is integrated with a telephony platform. The method may alternatively be used for any suitable application.

Figure 2:
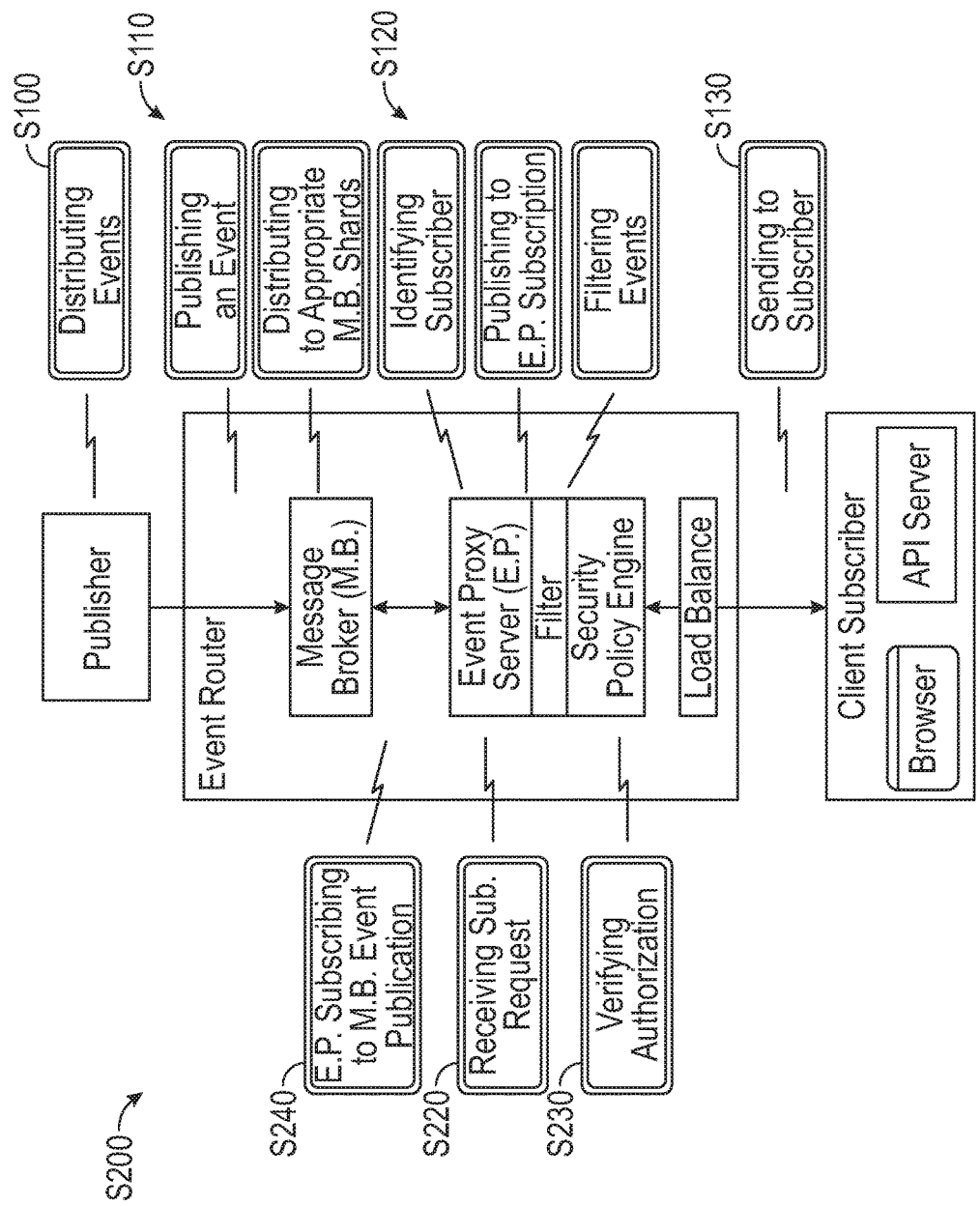
FIG. 2 is a detailed representation of methods of publishing an event and subscribing to an event of a preferred embodiment of the invention.

As shown in FIG. 2, distributing events S100 preferably includes the sub-steps publishing an event to a router S110, identifying subscribers to an event S120, and sending an event to a subscriber S130. As also shown in FIG. 2, subscribing to events S200 preferably includes the sub-steps of generating a signed URL for an event subscription S210, sending an event subscription request to an event router S220, verifying an event subscription S230, and allowing an event subscription S240. Except where noted below, steps S100 and S200 are preferably substantially similar to the method of publishing an event and the method of subscribing to an event as described in U.S. patent application Ser. No. 12/572,258, which is incorporated in its entirety by this reference. Publishing of an event S110 can preferably be published to the event router by any suitable device such as a web server of a web application, a call router for telephony application, client device like a mobile phone, or any suitable networked device. The method may additionally include allocating new resources to the event router. In particular event proxy servers and message brokers may be allocated or deallocated. Additionally, call routers, event distributors, and/or any suitable part or device of the system may be allocated or scaled to accommodate capacity needs. A load balancer may additionally distribute processing across the plurality of components.

The method may additionally include receiving a subscriber generated client event, publishing the client event to the event router and identifying a call router subscribed to a client event, and sending the client event to the call router. These steps function to make the eventing method full duplex for two-way event publication and subscription. The duplex eventing system is substantially similar to the eventing system described, but where the client generates the events and the call router is subscribed to the events. The processing of events may occur for any suitable direction of event messaging.

The method of processing events S300 preferably functions to enhance the handling of an event message during distribution from a publisher to a subscriber. The method of processing events S300 preferably occurs within an event router and may have a number of variations. Method S300 preferably includes substeps of interacting with an configuration attribute S310. The method S300 additionally includes numerous variations of acting on configuration attributes including routing an event message S320, communicating event messages to an external application S330, and/or storing messages S340. Any additional form of processing of a configuration attribute may additionally be performed. Interacting with a configuration attribute and acting on a configuration attribute preferably function to allow functionality and processing of an event to be customizable and flexible for operators of an event. Processing of event messages can preferably be customized for each event with publishers and/or subscribers. This preferably centralized event distribution so publishers only need to publish to a single event that is customized for any suitable distribution setup.

Figure 3:
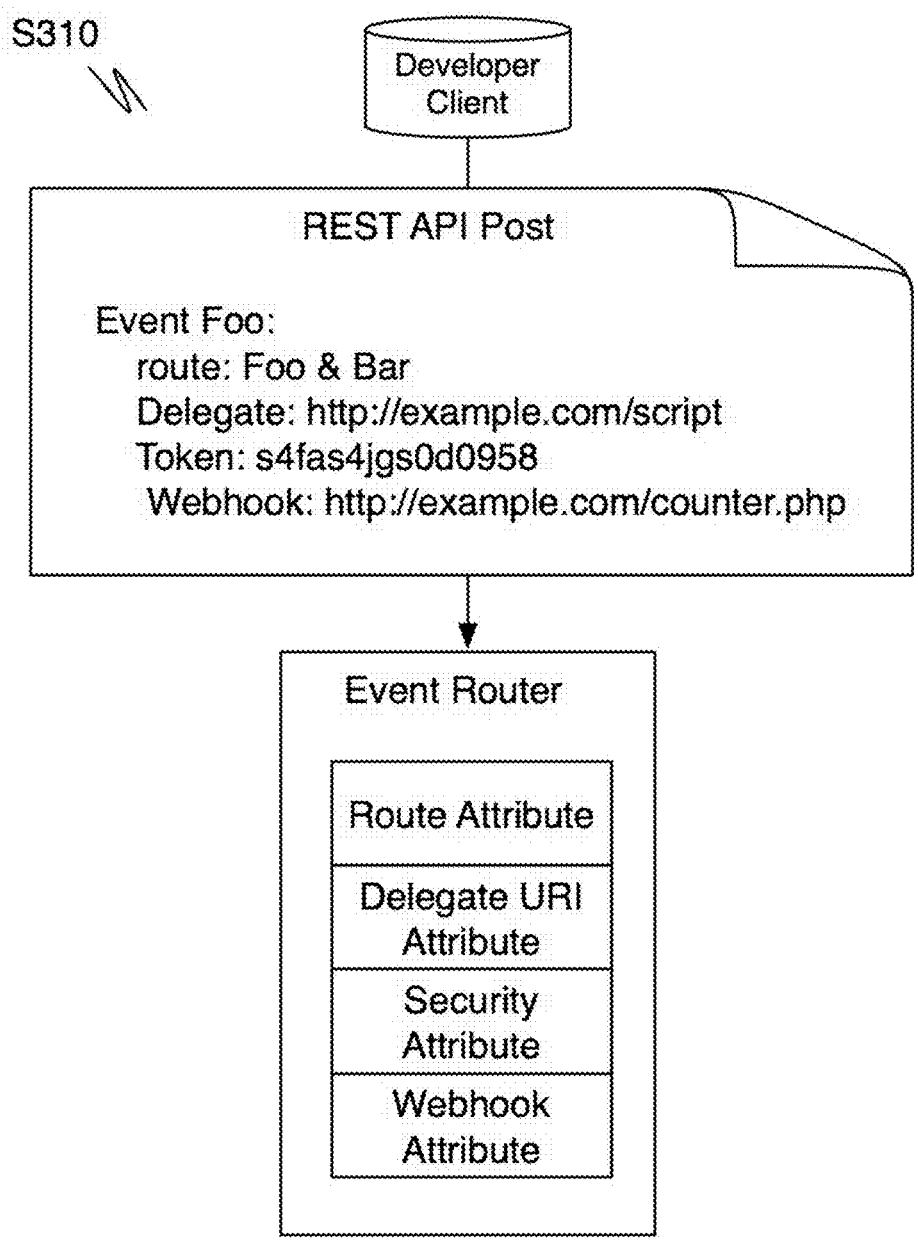
FIG. 3 is a detailed representation of interacting with configuration attributes of a preferred embodiment of the invention.

As shown in FIG. 3, step S310, which includes interacting with configuration attributes, functions to create, read, update, or delete resources of an event. A configuration attribute is preferably a parameter that defines functionality of event distribution. There is preferably a configuration attribute for event routing, a delegate URI, webhook, security, and/or any suitable parameter. The configuration attributes may be stored within the event router, but may alternatively be a resource accessible by the event router. A REST API is preferably used to interact with the configuration attributes, but any suitable interface may alternatively be used such as a simple object access protocol (SOAP). A HTTP message sent to an configuration URI preferably allows outside parties to interact with the configuration attribute. Receiving a POST HTTP message preferably sets a configuration attribute. Receiving a GET HTTP message preferably reads the configuration attribute value. The REST API preferably enables developers to programmatically control configuration attributes. Interacting with the configuration attributes may alternatively be accomplished through a user interface or set in any suitable manner.

Figure 4:
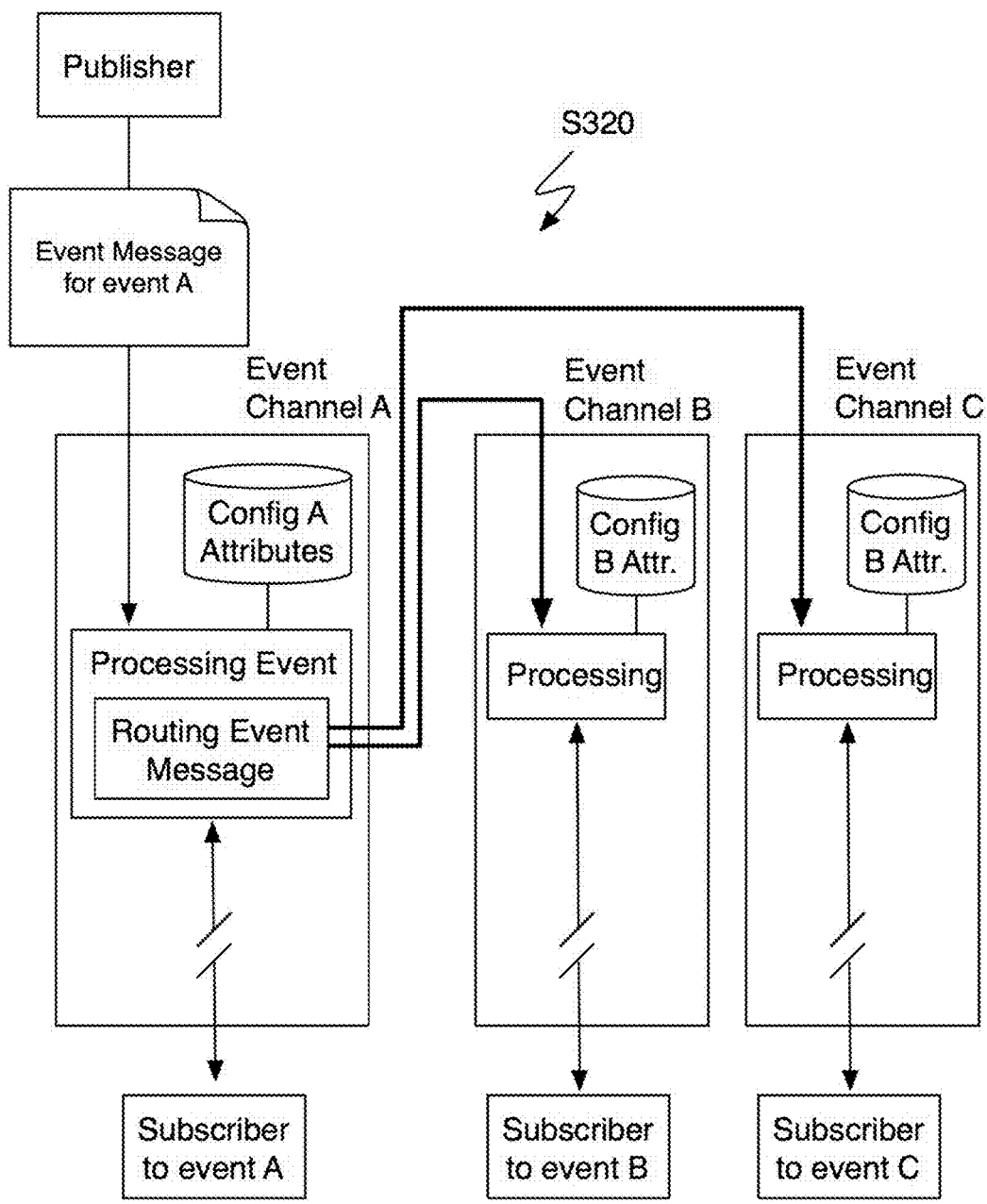
FIG. 4 is a detailed representation of routing an event message of a preferred embodiment of the invention.

As shown in FIG. 4, step S320, which includes routing an event message, functions to direct an event message to a variety of locations. A route preferably specifies where an event message should be published to once the event message is received by an event router. A default route preferably distributes the event message to subscribers of the same event channel. However, a route attribute may be changed so that, an event message is additionally routed to a plurality of event channels and/or subscribers of events. Event messages may alternatively be routed to an event channel different from the actual event channel (i.e., excluding the actual event channel). The event messages may be managed by the event router of the original event but may alternatively be an event on a different event router. One application of routing an event message may be to implement hierarchical event publishing. For example, a child event channel can preferably distribute to all parent event channels by adding a routing to the parent event channel. In this way the parent event channel will receive event messages from all child event channels. Another application of event routing may be to implement routing aliases. For example, a publisher preferably publishes to an event channel A and a subscriber may subscribe to an event channel A', where A' is used as an alias to event channel A. The routing attribute is preferably modified so that event messages published to event channel A are routed to event channel A'. This application preferably gives more control of event distribution to the developer managing the event because the routing can be altered without changing any settings of registered publishers or subscribers. Routing an event message to a new event preferably results in the event message being processed by the second event, where any webhooks, delegate URIs, routing, and/or any suitable processing is preferably executed. Though the event message may alternatively be directly sent to subscribers of the routed event channels without processing the event message according to the configuration attributes of an event channel.

Figure 5:
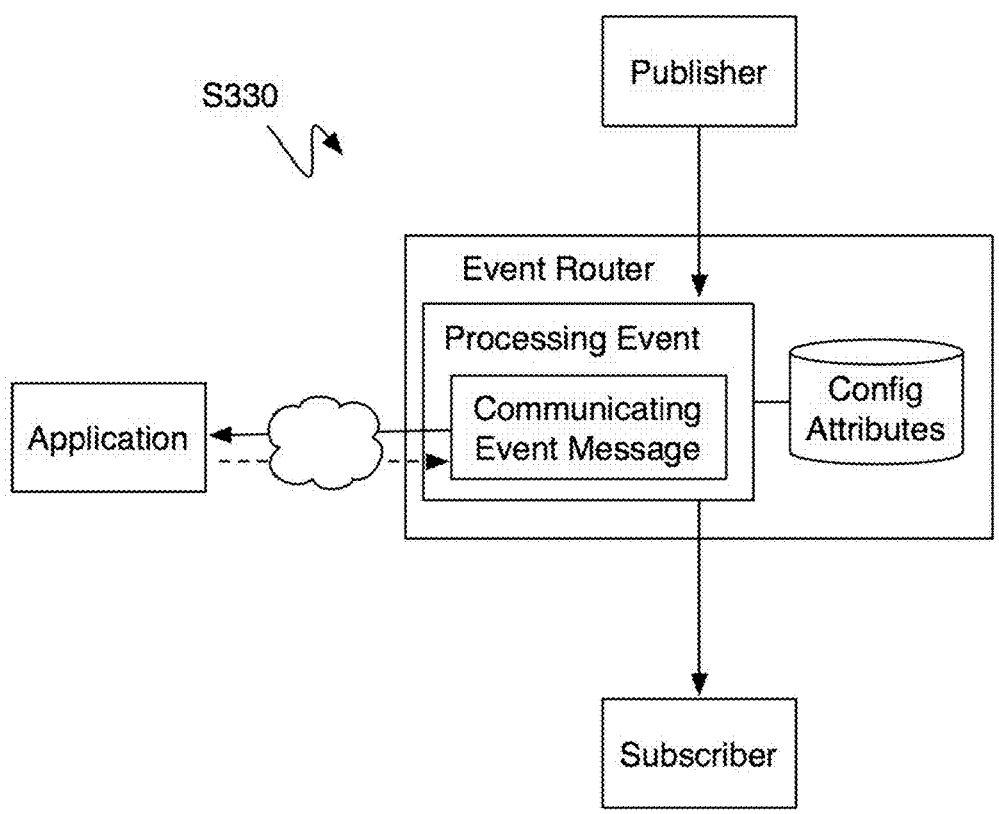
FIG. 5 is a detailed representation of communicating an event message to an application of a preferred embodiment of the invention.

As shown in FIG. 5, step S330, which includes communicating event messages to an application functions to allow outside processing of an event. The application is preferably an external application The outside processing is preferably performed by an application or a script at a remote location specified by a URI. Though the application or script may alternatively be specified by any suitable address or naming scheme. The communication of an event message to an application preferably has at least two variations. A first variation includes passing event handling to a delegate URI S332. A second variation includes triggering a webhook. In both variations, an event message is preferably sent to an external application or script. The application or script may alternatively be an internally controlled application. In the first variation, the application of a delegate URI preferably synchronously performs a task with the event message and then the event router receives an event message in response to the communicated event message. An event message may be altered by the delegate URI. In the second variation, the webhook application preferably performs any suitable task independent of further event processing. This may be asynchronous with the processing of the event message on the event router. An altered event message is not received. The second variation may function to trigger some action outside of event publication. The event message may be sent to any suitable numbers of external applications, and the order of communicating with the applications may additionally be set. For example, an event message may be first sent to a delegate URI, then the modified event message sent to a webhook, and then finally the modified event message is sent to second delegate URI for additional processing.

Figure 6A:
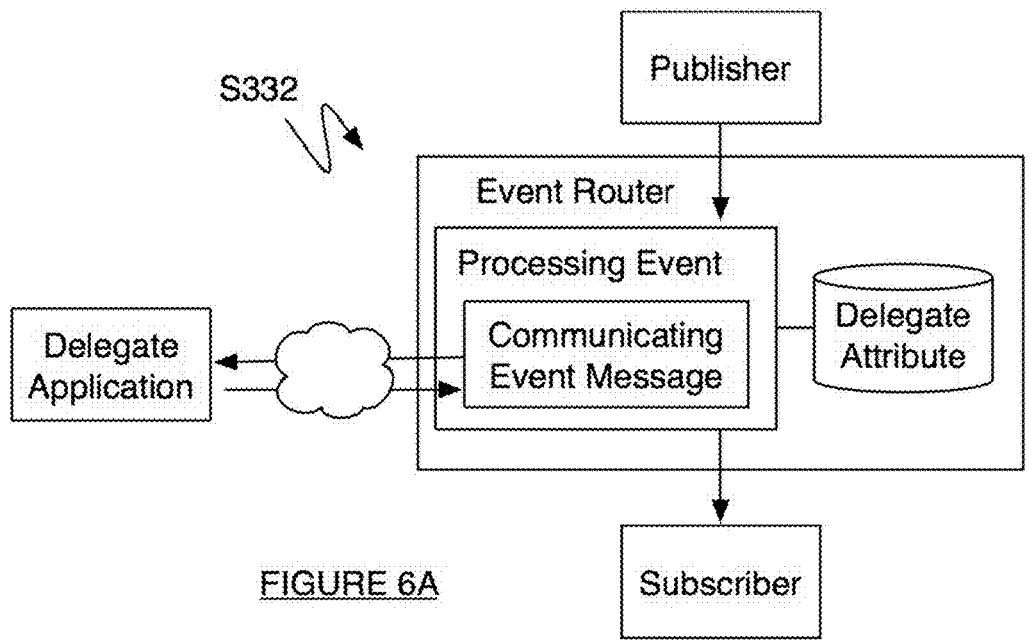
FIGS. 6A and 6B are variations of communicating an event message to an application of a preferred embodiment of the invention.

As shown in FIG. 6A, step S332, which passing event handling to a delegate URI, functions to allow outside processing of an event message before sending to a subscriber. The delegate URI is preferably an outside script or application that operates on the event message prior to distributing the event message. The delegate URI preferably returns a value as the event message to be further processed by the event router. The event message returned is preferably an altered version of the one sent to the delegate URI, but may alternatively be the same as the event message sent to the delegate URI. The delegate URI preferably synchronously operates on the event message, in that the event router preferably waits for a return value. When there are a plurality of delegate URI's the delegate URI's are preferably called in a sequential order, wherein subsequent delegates are sent the processed event message of previous delegates. Delegate URI's may alternatively be called in parallel. The delegate URI may process information from the event message such as data tracking, modifying the contents of the event message, changing or updating event message metadata. For example, a translation service may be setup for a delegate URI that translates an event message to a different language. Another example, a delegate URI may be used to automatically categorize the message through regular expression analysis and set event message metadata. Automatically categorizing an event message preferably enables better filtering of the event messages. Any number and order of delegate URIs may be specified. Event handling may additionally be passed to a delegate URI based on conditional requirements of the event message. In particular, event message metadata may be required to match particular values. For example, event messages with metadata of "language=English" may be processed as normal, but an event message with metadata "language=Spanish" may be passed to a delegate URI that translates Spanish to English. Additionally or alternatively, routing may be used in combination with delegate URIs so that a single event message may be processed and distributed to different events appropriately. Using the example above, the English event messages and translated Spanish event messages may be distributed to a route for English speakers, while the original Spanish event message a translated English event message (that had been passed to a English to Spanish translation delegate URI) are preferably routed to Spanish speakers. In another variation, delegate URI attributes are used to enforce policy. A policy delegate URI preferably returns a message that can be used in the logic of processing the event. Preferably a policy delegate URI is used in allowing or denying processing of an event message. The return value may be particular type of return message or alternatively the response may be added to the metadata of the event message or through any suitable mechanism. Preferably, a policy delegate URI is use to determine if event distribution should be allowed. If the response includes a failure response then halting or any suitable action is preferably halted. The policy delegate URI in this may be used to provide security, validating the message is authorized for distribution. A plurality of policy delegate URI's may additionally be used in parallel. The plurality of responses from the policy delegate URI's may be used to make a decision in event processing.

Figure 6B:
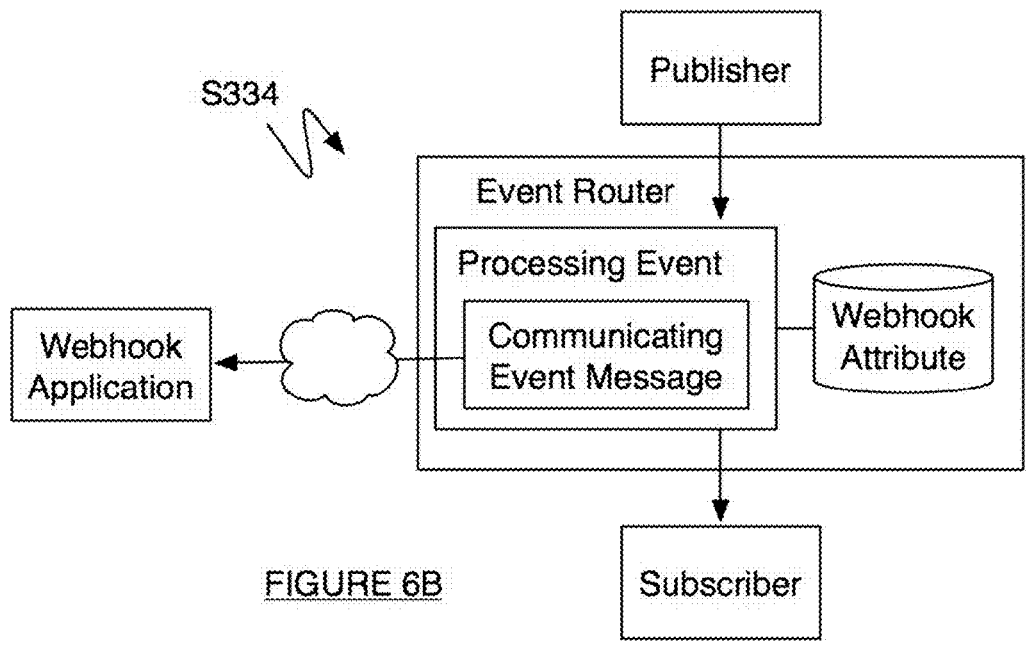

As shown in FIG. 6B, step S334, which includes triggering a webhook during event publication, functions to message an application or script that wishes to be notified of the occurrence of the event. The webhook configuration attribute is preferably an outside URI, but may alternatively be any suitable address or name alias. The notification caused by the webhook preferably causes some action by the application. When a webhook attribute has a URI specified, the event message is preferably sent to that URI on the occurrence of an event message. A webhook, may be used to create an external log of events, may trigger some event in a client, or perform any suitable action. The webhook application preferably does not reply to the event router with the event message, but the application may respond with a confirmation of the event message communication having been received. The event router preferably continues processing the event message after sending triggering the webhook since processing of the event message is not dependent on the actions of the webhook application.

Figure 7:
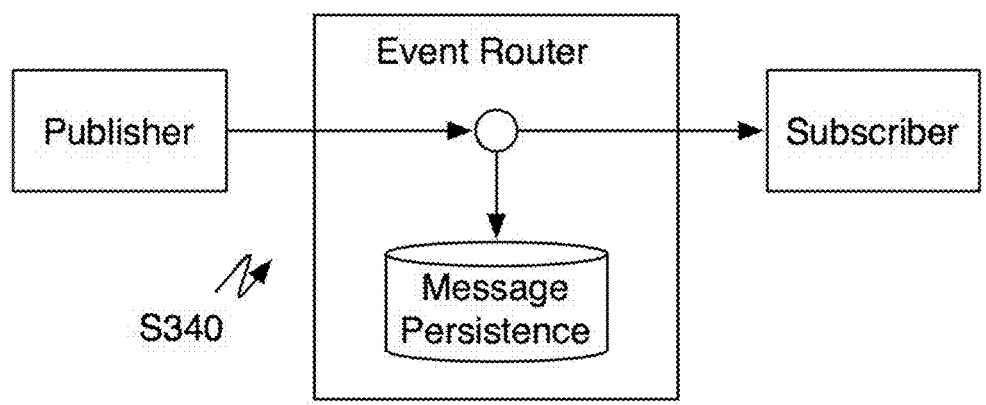
FIG. 7 is a detailed representation of storing an event message of a preferred embodiment of the invention.

As shown in FIG. 7, step S340, which includes storing messages, functions to create an accessible event message history. Messages are preferably stored in a database. And the event messages are preferably accessible through a REST API or through any suitable interface. Event message metadata may additionally be stored with the event message. The original event messages are preferably stored but alternatively event messages after processing by a delegate URI may be stored. The messages can preferably be retrieved or queried based on properties such as event message content, metadata, date/time, or any suitable properties. Stored messages can preferably be used by developers to create chat clients, content feeds, or any suitable collection of messages.

Figure 8:
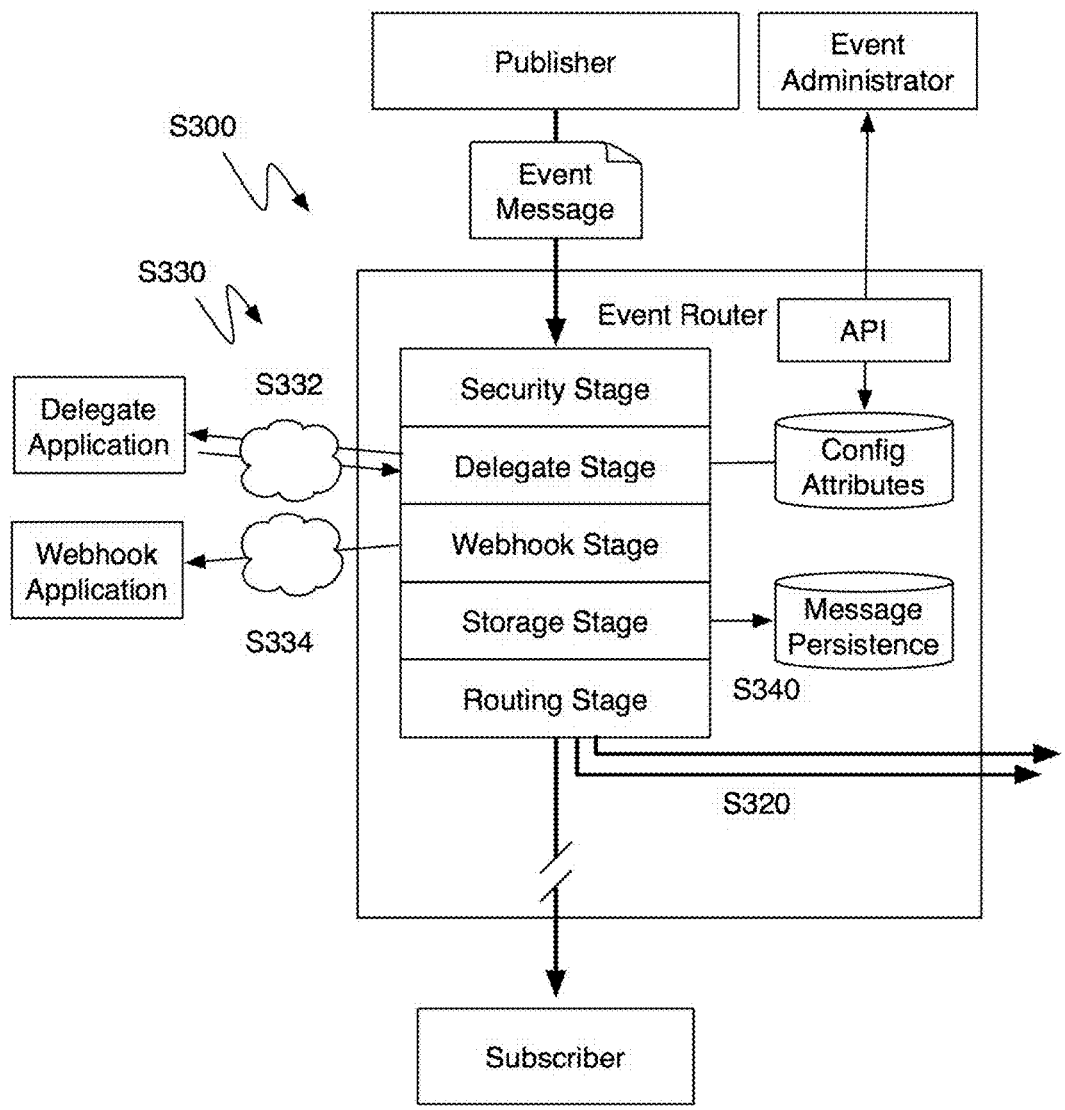
FIG. 8 is an exemplary sequence of processing an event message.

The processing of an event message by an event router may be configured in a number of various ways. Preferably, the processing of an event is a fixed sequence of operations. Each type of processing (e.g., communicating with a delegate URI, routing, etc.) preferably is performed in a set sequence. This sequence may have numerous variations. As shown in FIG. 8, one variation preferably is a set order of validating security for the event message, sending the event message to delegate URI, storing event message in persistent storage, triggering any webhooks, routing the event to other events, and then allowing the event message to continue with publication to a subscriber (if the routing calls for this). This order of processing stages may alternatively have any suitable order. A stage of processing may additionally be performed numerous times. For example, a plurality of delegate URI configuration attributes may be set. Each of the delegate URIs is preferably called sequentially. Any suitable protocol or convention may be used to determine the order of multiple iterations of a stage. Alternatively, the processing of an event may be fully or partially configurable. The ordering of the event processing steps may be determined by a parameter of a processing attribute. In this alternative, a portion of the steps or all the steps may be configured through an API to be performed in a certain order according to the preferences of the administrator of the event. For example, one application may call for routing to occur before sending to a delegate URI, and a second application may call for routing to occur after sending the event message to a delegate URI.

2. System for Enabling Real-Time Eventing

Figure 9:
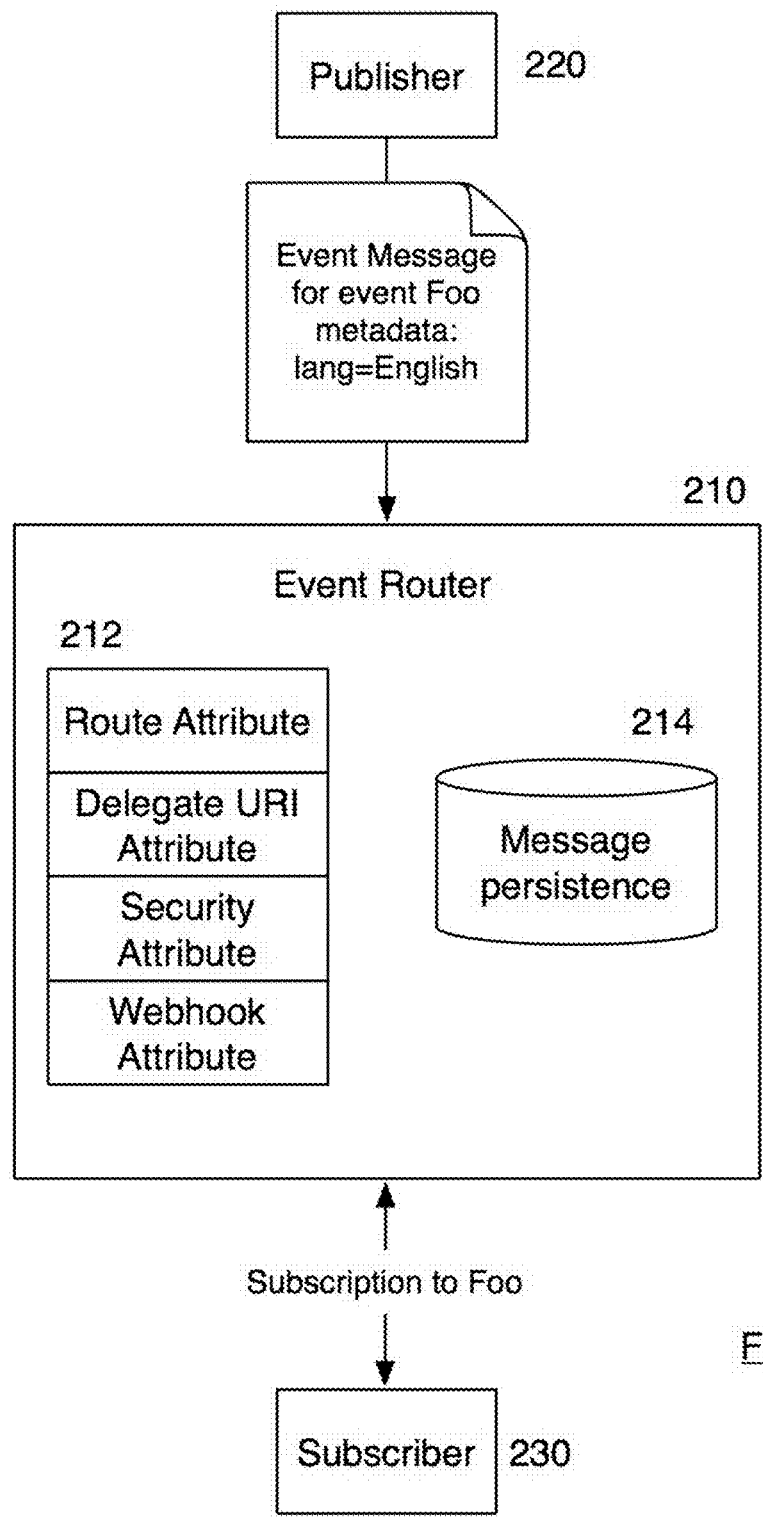
FIG. 9 is a schematic representation of a system of a preferred embodiment of the invention.

As shown in FIG. 9, a system 200 for enabling real-time eventing of a preferred embodiment includes an event router 210, a publisher 220, and a subscriber 230. The system 200 functions to create a framework for which events can be distributed to interested parties. The system preferably allows events to be processed and distributed in nearly real-time. Subscribers, parties interested in content of a publisher, preferably do not have to poll the publisher to check for event information. The system functions to actively send events to interested parties. The system may be used in any suitable application such as web applications, telephony network communications, online gaming, content feeds, chat clients, or any suitable application. The event router preferably includes configuration attributes that preferably enable the system 200 to handle event processing, perform complex event routing, and trigger event actions.

Figure 10:
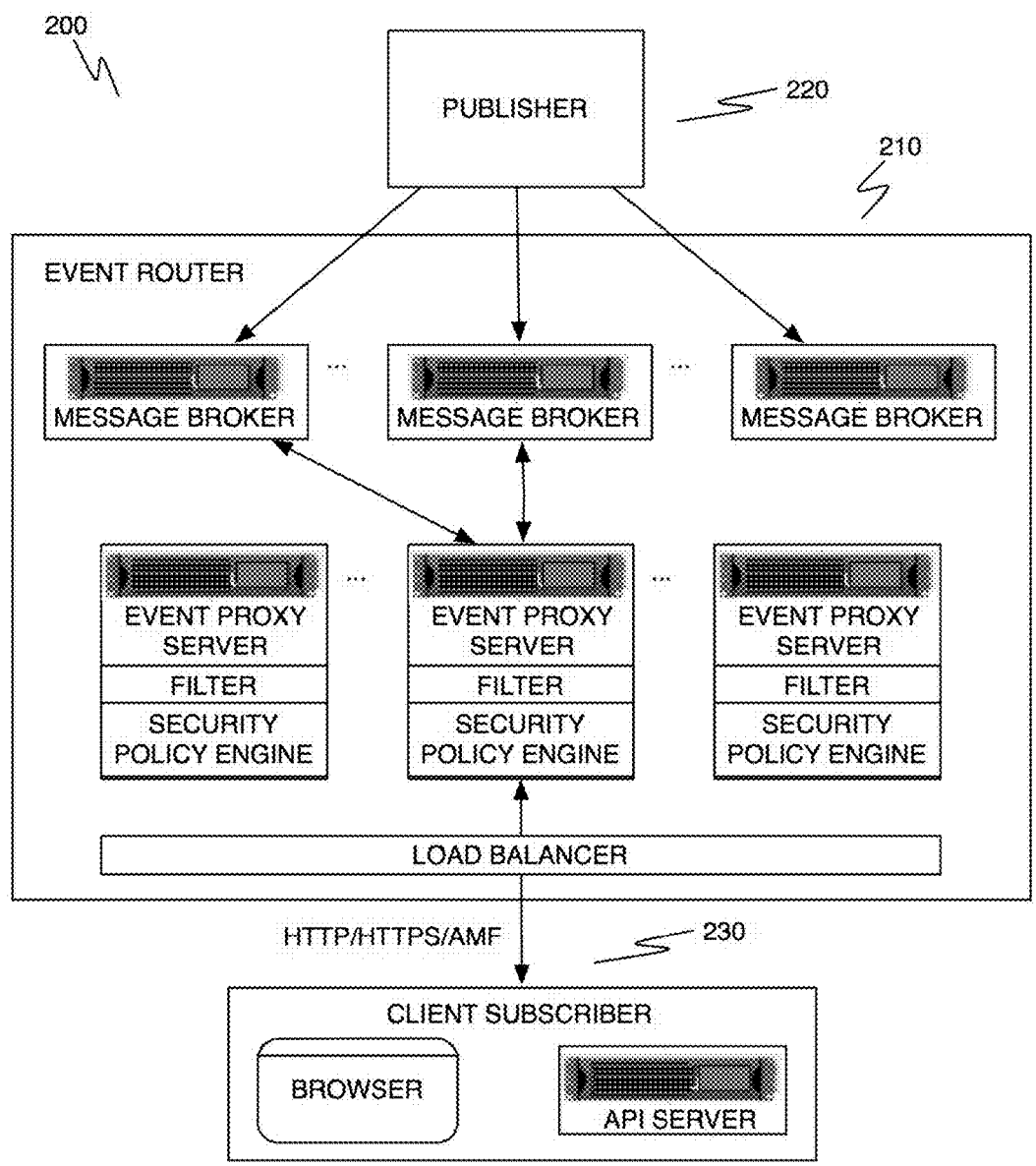
FIG. 10 is a detailed schematic representation of preferred embodiment of the invention.

An event router 210 of the preferred embodiment functions to maintain state of the publication and subscription (pub/sub) channel and manage distributing event messages. The subscriber 230 preferably registers a subscription to a particular event with the event router 210, and a publisher preferably 220 publishes content to a particular event channel on the event router 210. When the publisher publishes content in the form of an event message, the event router 210 preferably distributes the event message to all subscribers of the event. Preferably, the published event message is pushed to subscribers through an open HTTP connection (a single continuous HTTP connection). The open HTTP connection functions to simplify software of a web application using the system. Alternatively, the connection may push data with HTTPS, intermittent HTTP/HTTPS connections, AMF Channel, TCP connection, UDP connection, chat protocols such as jabber, or any suitable messaging framework. In one embodiment, as shown in FIG. 10, the event router 210 preferably includes an event proxy server and/or a message broker. The event proxy server preferably manages the subscriptions from a subscriber 220 (i.e., a client) and/or performs more computational intensive processes like filtering events and security. The message broker preferably manages the publications and more preferably manages a subset of event publications from the publisher. The event proxy server is preferably part of a cluster of event proxy servers that can be dynamically scaled to satisfy capacity requirements. The message broker is preferably part of a cluster of message brokers that can similarly be dynamically scaled to satisfy capacity requirements. A load balancer may additionally be included within the event router 220 to manage the capacity load of the various components (e.g., the event proxy servers 222 and the message brokers 228). A plurality of load balancers may be individually implemented for each component type, or a single load balancer may manage the event router 220. The event router 210 is preferably substantially similar to U.S. patent application Ser. No. 12/572,258, filed on 1 Oct. 2009 and entitled, "Telephony Web Event System and Method", which is incorporated in its entirety by this reference. However, the event router may have any alternative design.

Additionally, the event router 210 preferably includes configuration attributes 212. Configuration attributes are preferably parameters of the event that may affect event behavior, manage subscribers and/or subscribers, and/or manage any suitable parameter of the event router 210. Configuration attributes 212 are preferably stateful resources stored within the event router 210 or alternatively accessible by the event router 210. The configuration attributes are preferably accessible through a representational state transfer (REST) application protocol interface (API). The event router additionally preferably includes an event message persistence 214, which functions as a record of event messages.

Configuration attributes 212 preferably function as readable or editable parameters that define functionality of event distribution. The configuration attributes 212 may be used as processing resources that impact event message processing. The configuration attributes are preferably RESTful resources in that the configuration attributes preferably have an associated URI that can receive HTTP messages. There is preferably a plurality of various configuration attributes that may be used with an event such as a route attribute, permissions attribute, a webhook attribute, a delegate URI attribute, or any suitable attribute. A route attribute preferably functions to define routing of an event message to additional events. A route may be defined to direct event messages to any suitable event or number of events. For example a route for event A may be defined so that event messages are additionally directed to event B. A permissions attribute may define security measures to control the publication and/or subscription of events. The permissions attribute may include security tokens that are used to validate subscribers or publishers. A webhook attribute preferably defines a URI that is sent a HTTP callback when an event message is received. The webhook URI functions to create even more flexibility in the sub/pub paradigm, where events can cause server actions through webhook mechanisms. A delegate URI attribute preferably defines a URI that is passed an event message prior to distributing the event message to subscribers. A delegate URI functions to enable outside processing of an event. The resource at the delegate URI is preferably a script or application that modifies the event message but may alternatively be reading the event message or using the event message in any suitable fashion. One example of a delegate URI may be a translation service that translates event messages to a different language prior to distribution to subscribers. There may additionally be a processing attribute or attributes that determine the ordering and configuration of the processes associated with the other configuration attributes. For example, an event may require an event message to be routed to a second event and then translated by a delegate URI (such that the second event does not receive the translated event message). While another event may require an event message to first be translated by a delegate URI and then routed. As an alternative, the configuration for processing an event may be set through a convention.

Message persistence 214 preferably functions to be an accessible record of past event messages. The message persistence is preferably a database of previous event messages. All event messages are preferably stored but event messages may alternatively be stored for certain amount of time or the message persistence 214 may store a particular number of event messages or particular portion of an event message. A record of event message may additionally store event message metadata as described below. The message persistence is preferably queryable.

The event router 210 preferably includes a configured order to the processing of an event message. In one preferred variation shown in FIG. 8, the event router initially uses a security attribute to verify that the event message is sent from an authenticated publisher. This may include verifying through a secret key shared between at least the publisher and the event router. Next, a delegate URI configuration attribute is retrieved and the event message is sent to the specified delegate URI. The application or script at the delegate URI preferably processes the event message. While processing, the event message may be altered. The event router preferably waits for a response from the delegate. This is preferably repeated for any suitable number of delegate URI configuration attributes. Next the event message is preferably stored within the message persistence 214. At substantially the same time or either before or after storing the event message, a webhook configuration attribute is preferably retrieved. The event message is preferably sent to the URI of the webhook configuration attribute. Then a routing configuration attribute is preferably retrieved, and the event message is routed to the specified event(s) in the routing configuration attribute. In the above cases, a process is preferably not performed if no configuration attribute is set for the associated process. The event router 210 may alternatively have any suitable layout/ordering. For example, routing may occur before sending an event message to a delegate URI.

The publisher 220 of the preferred embodiment functions to create event messages for distribution. The publisher 220 may be any suitable networked device. The publisher may be a web server of a web application, a call router for telephony application, client device like a mobile phone, or any suitable networked device. The publisher is preferably registered with the event router 210 to know what events the publisher will be publishing. The publisher preferably creates an event message when the publisher 220 wants to notify subscribers of an event. The event message as described above preferably includes the event related message, which may include text, media, and/or any suitable data. The event message may additionally include event message metadata such as the category of the event message. The event message may additionally include a security token that functions to authenticate the identity of the publisher 220 and prevent others from posing as the publisher 220.

Event message metadata is preferably any suitable contextual data related to an event message. The event message metadata is preferably used by publishers 220, subscribers 230, and the event router 210 to more finely define functionality of event distribution. Event message metadata preferably describes message category, a tag, location information, time, author, mediatype, language, source, and/or any suitable metadata related to a particular event message. The metadata is preferably used for filtering event messages for a subscriber. For example, a subscriber may subscribe to an event called "news", but only want to be notified of event messages that have the metadata event attribute of "tag=San Francisco". Functionality of event attributes may additionally be conditionally enabled for event messages with particular metadata. Event routing, delegate URIs, and webhooks may only be used if metadata satisfy set conditions.

The subscriber 230 of the preferred embodiment functions to receive event messages from the event router 210. The subscriber preferably registers with the event router 210 to receive notifications of a particular event. The subscriber may additionally setup any suitable forms of filters for receiving event messages. Any suitable Boolean logic may be used with event messages and attributes to determine which event messages a subscriber 230 receives.

An alternative embodiment preferably implements the above methods in a computer-readable medium storing computer-readable instructions. The instructions are preferably executed by computer-executable components such as an event router. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable hardware device.

As a person skilled in the art will recognize from the previous detailed description and from the figures and claims, modifications and changes can be made to the preferred embodiments of the invention without departing from the scope of this invention defined in the following claims.

We claim:

1. A method comprising:
   receiving a first event subscription request from a first subscriber, and receiving a second event subscription request from a second subscriber, the first event subscription request being for occurrence of a first type of event and the second event subscription being for occurrence of a second type of event, the first type of event being different than the second type of event;
   in response to receiving the first event subscription request and the second event subscription request, subscribing the first subscriber to a first event channel for the first type of event, and subscribing the second subscriber to a second event channel for the second type of event, the first event channel being associated with a first event processing attribute dictating a first sequence for processing events of the first type;
   receiving a first event message from an authenticated publisher system, the first event message indicating an occurrence of the first type of event during operation of an application;
   in response to receiving the first event message, processing the first type of event according to the first sequence dictated by the first event processing attribute, yielding a first processed event message, the first sequence specifies routing the first event message to the second event channel; and
   sending the processed event message to the first subscriber as a result of the first subscriber being subscribed to the first event channel, and sending the first event message to the second subscriber as a result of the first event processing attribute and the second subscriber being subscribed to the second event channel.

2. The method of claim 1, further comprising:
   in response to receiving the first event message, identifying a set of subscribers that are subscribed to the first event channel, the set of subscribers including the first subscriber.

3. The method of claim 1, further comprising:
   receiving, from at least one subscriber system, the first event processing attribute, the first event processing attribute received via an application programming interface (API).

4. The method of claim 1, wherein the authenticated publisher system generates the first event message responsive to the occurrence of the first type of event during operation of the application.

5. The method of claim 1, further comprising:
   receiving at least one routing attribute from the authenticated publisher system via an API.

6. The method of claim 1, further comprising:
   receiving at least one routing attribute from an external developer system via an API.

7. The method of claim 1, further comprising:
   receiving at least one routing attribute from a subscriber system via an API.

8. An event router system comprising:
   one or more computer processors; and
   one or more computer-readable mediums storing instructions that, when executed by the one or more computer processors, cause the event router system to perform operations comprising:
      receiving a first event subscription request from a first subscriber, and receiving a second event subscription request from a second subscriber, the first event subscription request being for occurrence of a first type of event and the second event subscription being for occurrence of a second type of event, the first type of event being different than the second type of event;
      in response to receiving the first event subscription request and the second event subscription request, subscribing the first subscriber to a first event channel for the first type of event, and subscribing the second subscriber to a second event channel for the second type of event, the first event channel being associated with a first event processing attribute dictating a first sequence for processing events of the first type;
      receiving a first event message from an authenticated publisher system, the first event message indicating an occurrence of the first type of event during operation of an application;
      in response to receiving the first event message, processing the first type of event according to the first sequence dictated by the first event processing attribute, yielding a first processed event message, the first sequence specifies routing the first event message to the second event channel; and
      sending the processed event message to the first subscriber as a result of the first subscriber being subscribed to the first event channel, and sending the first event message to the second subscriber as a result of the first event processing attribute and the second subscriber being subscribed to the second event channel.

9. The event router system of claim 8, the operations further comprising:
in response to receiving the first event message, identifying a set of subscribers that are subscribed to the first event channel, the set of subscribers including the first subscriber.

10. The event router system of claim 8, the operations further comprising:
receiving, from at least one subscriber system the first event processing attribute, the first event processing attribute received via an application programming interface (API).

11. The event router system of claim 8, wherein the authenticated publisher system generates the first event message responsive to the occurrence of the first type of event during operation of the application.

12. The event router system of claim 8, the operations further comprising:
receiving at least one routing attribute from the authenticated publisher system via an API.

13. The event router system of claim 8, the operations further comprising:
receiving at least one routing attribute from an external developer system via an API.

14. The event router system of claim 8, the operations further comprising:
receiving at least one routing attribute from a subscriber system via an API.

15. A non-transitory computer-readable medium storing instructions that, when executed by one or more computer processors of an event router system, cause the event router system to perform operations comprising:
receiving a first event subscription request from a first subscriber, and receiving a second event subscription request from a second subscriber, the first event subscription request being for occurrence of a first type of event and the second event subscription being for occurrence of a second type of event, the first type of event being different than the second type of event;
in response to receiving the first event subscription request and the second event subscription request, subscribing the first subscriber to a first event channel for the first type of event, and subscribing the second subscriber to a second event channel for the second type of event, the first event channel being associated with a first event processing attribute dictating a first sequence for processing events of the first type;
receiving a first event message from an authenticated publisher system, the first event message indicating an occurrence of the first type of event during operation of an application;
in response to receiving the first event message, processing the first type of event according to the first sequence dictated by the first event processing attribute, yielding a first processed event message, the first sequence specifies routing the first event message to the second event channel; and
sending the processed event message to the first subscriber as a result of the first subscriber being subscribed to the first event channel, and sending the first event message to the second subscriber as a result of the first event processing attribute and the second subscriber being subscribed to the second event channel.

16. The non-transitory computer-readable medium of claim 15, the operations further comprising:
in response to receiving the first event message, identifying a set of subscribers that are subscribed to the first event channel, the set of subscribers including the first subscriber.

17. The non-transitory computer-readable medium of claim 15, the operations further comprising:
receiving, from at least one subscriber system the first event processing attribute, the first event processing attribute received via an application programming interface (API).

18. The non-transitory computer-readable medium of claim 15, wherein the authenticated publisher system generates the first event message responsive to the occurrence of the first type of event during operation of the application.

19. The non-transitory computer-readable medium of claim 15, the operations further comprising:
receiving at least one routing attribute from the authenticated publisher system via an API.

20. The non-transitory computer-readable medium of claim 15, the operations further comprising:
receiving at least one routing attribute from an external developer system via an API.

* * * * *